Aug. 11, 1970     T. KOHN     3,523,451
PRESSURE GAUGE

Filed Sept. 5, 1967     3 Sheets-Sheet 1

INVENTOR
THEODORE KOHN
BY A. J. Castorina
ATTORNEY

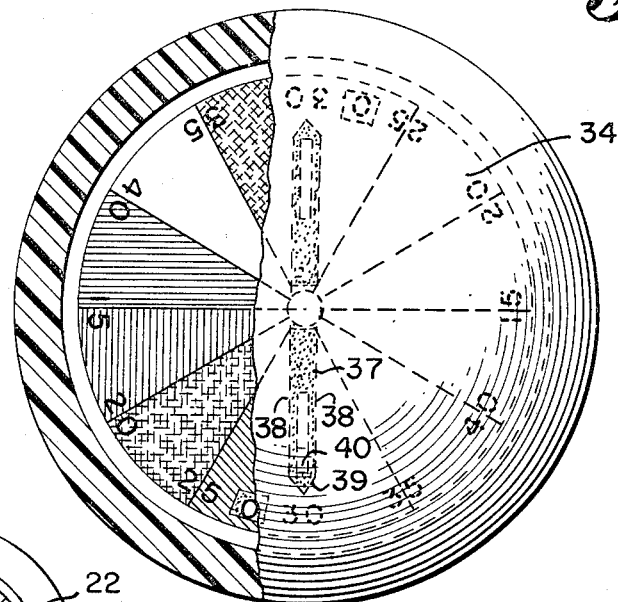
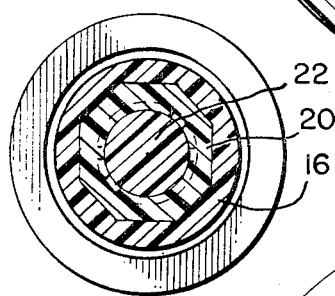
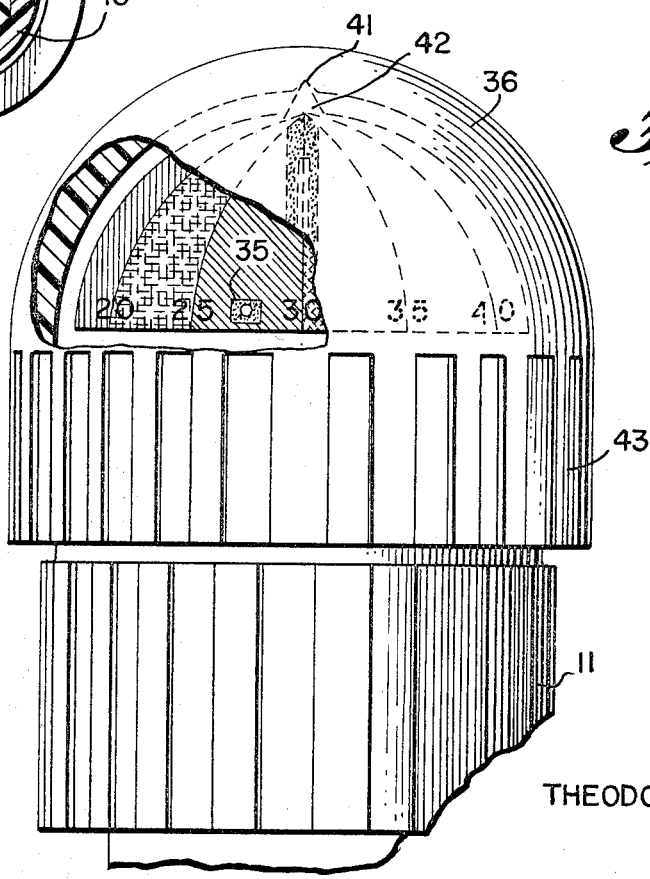

Aug. 11, 1970  T. KOHN  3,523,451
PRESSURE GAUGE

Filed Sept. 5, 1967  3 Sheets-Sheet 3

INVENTOR
THEODORE KOHN

BY A. J. Castorina
ATTORNEY

United States Patent Office 3,523,451
Patented Aug. 11, 1970

3,523,451
PRESSURE GAUGE
Theodore Kohn, 3500 Kensington Ave.,
Richmond, Va. 23221
Filed Sept. 5, 1967, Ser. No. 665,395
Int. Cl. B60c 23/04
U.S. Cl. 73—146.8
8 Claims

ABSTRACT OF THE DISCLOSURE

A tire gauge is constructed from a plurality of interrelated components designed with a common configuration for condensing the assembly to minimum length and size. A domed shaped portion in the opening of the gauge forces the tire valve downward to permit the pressure of air from the tire to be measured. The gauge may be left on the tire and a continuous pressure reading obtained or electronic equipment may be associated with the gauge to provide readings in areas remote from the gauge.

BACKGROUND OF THE INVENTION

The need for the present invention arises from the fact that, while indicators for measuring fluid pressure both accurately and economically are known, there has been no indicator for measuring tire pressure as effectively, accurately or economically as that of this invention.

The prior art is aware of gauges for measuring fluid pressures, for example, tire pressures, bottled gas pressure and fire extinguisher pressure, wherein the gauge is directly attached to a valve stem provided on the tire or the receptacle. However, these devices are in the main fabricated and designed with no thought to the provision of simple, economical components which cooperate to provide a gauge which is small but readable from a substantial distance. Also, these gauges are generally designed without any thought to the repair of the same and, commonly, when they become defective, are discarded.

The present gauge overcomes the gauges of the prior art in that the same is simple in construction, economical to fabricate and has so few moving parts that the incidence of defectiveness is negligible. One object of the present invention is to provide a gauge having an indicator which can be easily read, day or night, from a distance of several feet from any angle and under any weather conditions.

Another object of the invention is the provision of a gauge having an indicator which is both color coded and provided with indicia.

A further object of the invention is the provision of a gauge which can be readily equipped with certain miniaturized electronic equipment for providing readings to remote stations.

These objects and still further objects, advantages and features of the invention will become all apparent from the following discussion of the drawings and description thereof.

SUMMARY OF THE INVENTION

The invention relates to a pressure gauge adapted to be attached to a source of pressure comprised of a tubular main body portion having a dome-shaped portion at one end thereof and a threaded portion at its other end for attachment to a valve or the like. The dome-shaped portion is provided with an annular opening within its center which is adapted to nestingly receive the stem of a dome-shaped indicator dial therein, which in turn cooperates with the stem of an inverted dome-shaped actuator inserted in the said opening. The actuator stem is provided with a cam track which cooperates with cam lugs provided on the indicator stem, causing the same to turn as the actuator is moved upwardly by the fluid pressure impinging on a diaphragm positioned below the actuator. The indicator is provided with a bearing surface which seats in a cut-out portion of a transparent cover encasing the major portion of the gauge for protecting the same against the weather and inanimate objects. Additionally, the cover is in sealed relationship with the main body of the gauge to provide a pressure chamber which is essential to the calibration of the gauge. Thereafter, the movement of the indicator relative to an index line serves to transmit either visually or remotely the exact pressure within the container.

BRIEF DESCRIPTION OF THE DRAWINGS

FIG. 4 is a top view showing the details of the gauge indicator taken on line 4—4 of FIG. 2;

FIG. 5 is a sectional view taken along line 5—5 of FIG. 2;

FIG. 6 is an elevational view showing the details of the gauge housing and its association with the indicator;

DESCRIPTION OF THE PREFERRED EMBODIMENT

Figure 1:
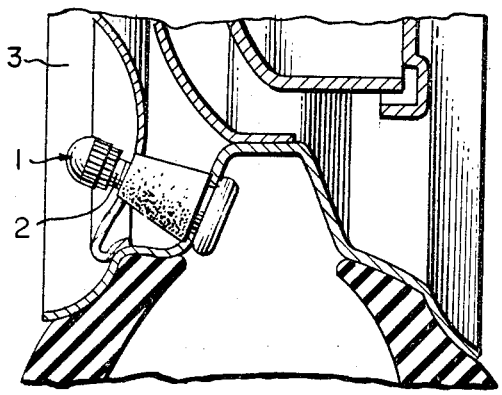
FIG. 1 is a fragmentary sectional view through an automobile wheel showing the gauge installed on the valve stem of the tire.
Figure 2:
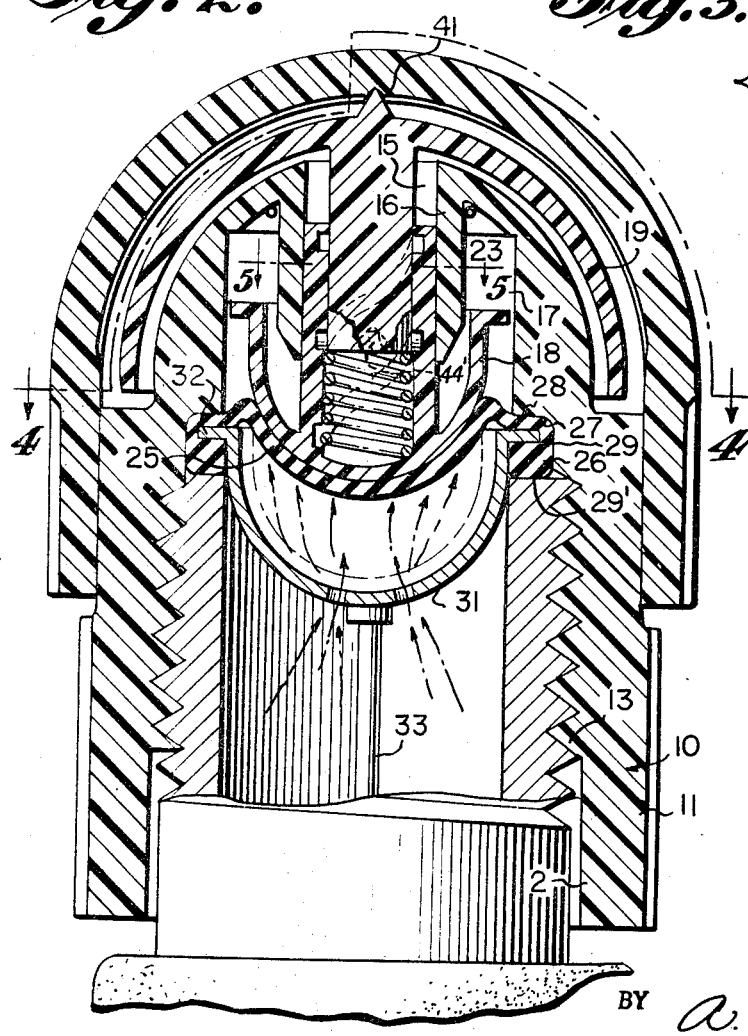
FIG. 2 is a sectional view through the gauge showing its association with the valve of the tire.
Figure 3:
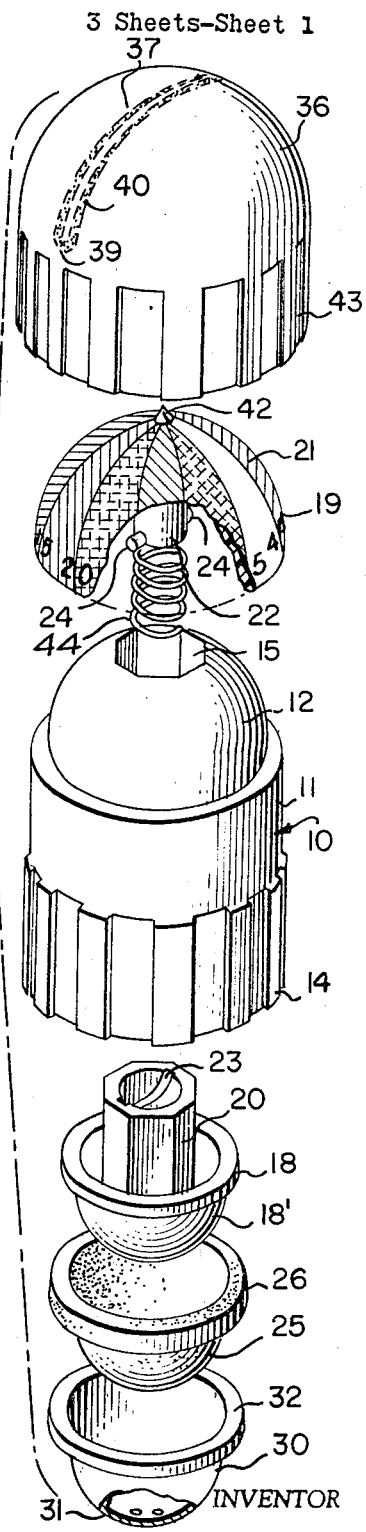
FIG. 3 is an exploded view showing the details of the component parts of the gauge and its mode of assembly.

Referring to the drawings, and in particular FIGS. 2 and 3, wherein like numerals designate like parts, the gauge is depicted generally by the numeral 1, and is comprised of a main body portion 10 in the form of a tubular sleeve 11 having an integral dome 12 formed at one end thereof. The sleeve 11 is provided with interiorly disposed threads 13 and an exteriorly knurled or finger-grasping surface 14 to facilitate the connection of the gauge 1 to a threaded valve stem 2 of a wheel assembly 3, as shown in FIG. 1. The dome-shaped portion 12 is provided with a centrally disposed passageway 15 which is axially aligned with the opening of the sleeve 11. The passageway 15 is defined by a depending member 16 which is spaced from the interior wall 17 of the dome portion 12. As is readily seen in FIG. 3, the passageway 15 is defined by an octagonal shape, but it is considered to be within the purview of the present disclosure to form this passageway of any configuration which will prevent rotation of the cooperating part inserted therein.

An inverted mushroom-shaped actuator 18 is positioned within the passageway 15 for cooperative inter-relationship with an indicator 19, also having a mushroom-type shape. The actuator 18 is formed with a dome-like portion 18′ having an integral stem 20, while the indicator 19 is provided with a dome 21 and an integral stem 22. The stem 20 of the actuator is shaped to be conformably received in the opening 15 to permit a snug, non-rotatable, slidable fit therewith. The interior of the stem 20 is provided with two diametrically opposed spiral cam tracks 23 which cooperate with cam followers 24 diametrically opposed on the stem 22 of the indicator. As is readily apparent from both FIGS. 2 and 3, the cam followers 24 of the indicator are inserted in alignment with the cam tracks 23 of the actuator to be controlled thereby in a manner to be explained hereinafter.

Cooperating with the actuator 18 is an elastomer diaphragm 25 of hemispherical shape having a thickened peripheral edge portion 26. The edge portion 26 is provided with a surface area 27 adapted to engage a ledge 28 provided on the interior of the sleeve 11 for the purpose of seating the same adhesively thereagainst. The edge portion 26 is additionally provided with an annular groove 29 to receive a flange of a valve depressor 30. The depressor 30 is also hemispherical in shape and is formed with a plurality of openings 31 in the body thereof and with a flange 32 adapted to be inserted within the groove 29 of the diaphragm edge 26. The depressor 30 functions to depress the valve 33 positioned within the valve stem 2 as the gauge is threaded thereon to permit the flow of air, as shown by the arrows in FIG. 2, out of the tire, through the openings 31 and onto the diaphragm 25.

It is essential that the diaphragm 25 and depressor 30 be secured to the ledge 28 and to one another at 29 in air-tight relationship, in order to provide a pressure chamber above the diaphragm in which a charge of air may be trapped for purposes to be explained hereinafter. Also, the lower edge portion 26 of the diaphragm serves to prevent the escape of air from the tire outwardly through the threaded connection of the stem 2 and sleeve 11 by engaging the end 29' of the stem 2 in air-tight fashion.

FIGS. 4 and 6 illustrate the dome 21 of the indicator 19 of the present invention divided into a plurality of generally triangular shaped sectors 34 of different colors, wherein each colored sector corresponds to a different pressure reading, for example, the color red may designate a low pressure range, 15 to 20 pounds; green, 20 to 25 pounds; yellow, 25 to 30 pounds, etc. While the color coding may follow any set pattern, it is suggested that red be used to designate a low pressure area as this color is associated with danger conditions.

It is also noted that each of the zones are provided with numerical indicia to provide the user of the gauge with a familiarity of the colors used with reference to the various pressures during his initial use of the gauge. In reality, these numerals will only be legible to the user when he is in close proximity to the gauge due to the smallness of the same.

The indicator is also provided with a marked area designated at 35, which is luminous in order that the gauge may be readily read at night-time. This luminous area is located at a pressure reading which is considered to be predominant or preferable for the tire being used, for example, 28 pounds is a satisfactory pressure for the majority of tires presently in use. Obviously, the location of the luminous mark will be dependent on the tire size it is to be used with and will be accordingly marked in the proper zone.

A transparent cover 36 is provided for enclosing the aforementioned component parts of the gauge in order that the same may be protected against the weather and any other unexpected forces such as stones and undue handling, and is marked with an index area which co-operates with the indicia of the indicator. This cover, like the other component parts, is formed in a domed configuration, which is held in sealed relation with the body forming an adjustable pressure chamber which may be calibrated to balance the pressure against the diaphragm at a given indicator reading, whereafter it is permanently sealed in this position. For example, if the gauge were to be used in conjunction with a tire which in use is to be inflated to a pressure of 28 pounds the assembler would place the gauge on a known pressure source, e.g. 28 pounds and push downwardly on the cover 36 until the index section 37 thereof is aligned with the 28 pound mark on the indicator 19 to thereby set the correct amount of pressure which is to be maintained between the diaphragm and cover.

As was previously mentioned, the cover 36 is provided on its underside with an indexing section 37 which serves as a reference line with the aforementioned colored triangular sections and luminous portion of the indicator. As is seen in FIG. 3, the index portion 37 is formed by two spaced parallel lines 38 which are closed at their respective ends 39 to thereby define a small segmented area which, when contrastingly colored with respect to the colored sections of the indicator 19, will cooperate therewith to inform the user of his tire pressure by a quick visual glance thereof. Within the index portion 37 is a smaller segmented area 40 conforming in shape to that of the area 37 which is treated with luminous material in order that the same may cooperate with the dot or luminous portion 35 of the indicator in order to provide a visual inspection of the gauge at night-time.

It is to be understood that, while the index portion 37 is depicted as a typical dial hand, it is considered that the same may be formed as a line with or without a slightly pointed portion with the luminous area 40 cooperatively conforming therewith. The cover member 36 is also utilized as a support for the indicator 19 and is formed with a cut-out portion 41 which serves as a bearing surface for the bearing tip 42 provided on the indicator 19. The cover may be knurled in the same fashion as the main body 10 of the gauge as at 43 for facilitating the handling thereof.

In assembling the gauge, the component parts are nested and interfitted with one another in a manner as shown in the exploded view of FIG. 3. In this regard, a spring 44 is disposed within the hollow stem 18 of the actuator and serves as a low friction bearing for the indicator stem by positioning the end 44' thereagainst to maintain the bearing indicator tip 42 against the bearing surface 41 regardless of the calibrated position of the cover. The spring also functions to maintain the space between the indicator 19 and cover 36 constant to insure that the readings thereon will always be easily and accurately read regardless of the height of the cover when calibrated and as compared to a gauge wherein the indicator moves away from a viewing surface. The pressure of the air trapped in the pressure chamber will then assist the bias of the spring to return the dial 19 back to the pressure reading for which the gauge was set.

From the above, it is to be noted that upon inspection of the present gauge, all of the component parts are formed with a basic common shape, for example, the parts all have a dome-shaped relationship, which provides a compact unit due to the fact that the parts may be nested one within the other, in a telescoped relation so as to diminish the whole assembly into the shortest possible space. Also, it is apparent that due to the conformation of shape, the parts may be readily manufactured from any suitable plastic by injection molding, without requiring a great deal of expense in the way of apparatus for fabricating the gauge.

In use, the purchaser merely attaches the valve stem engaging means 11 to the threads thereof and as he tightens the same thereon, the depressor 30 serves to force the valve 33 downwardly to permit the flow of air from the tire through the passages 31 to impinge on the diaphragm 25. Upward movement of the diaphragm causes the actuator 18 to move upwardly against the opposing air pressure in the pressure chamber to thereby cause the indicator 19 to turn relative to the cover 36. The turning of the indicator will serve to move a selected color zone 34 with reference to the index hand or line 37 on the cover 36 to thereby indicate the pressure.

Figure 8:
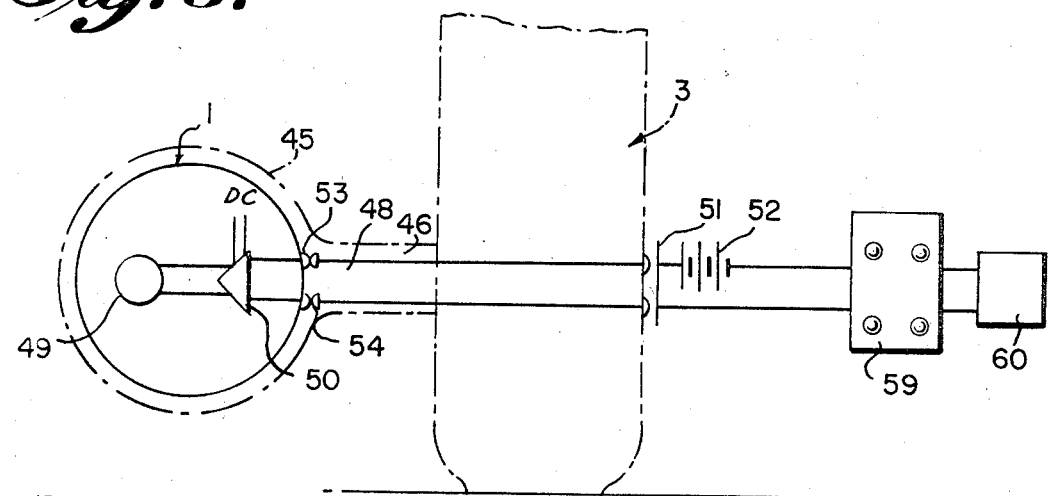
FIGS. 8 and 9 illustrate other electronic circuits capable of being utilized with the gauge.
Figure 9:
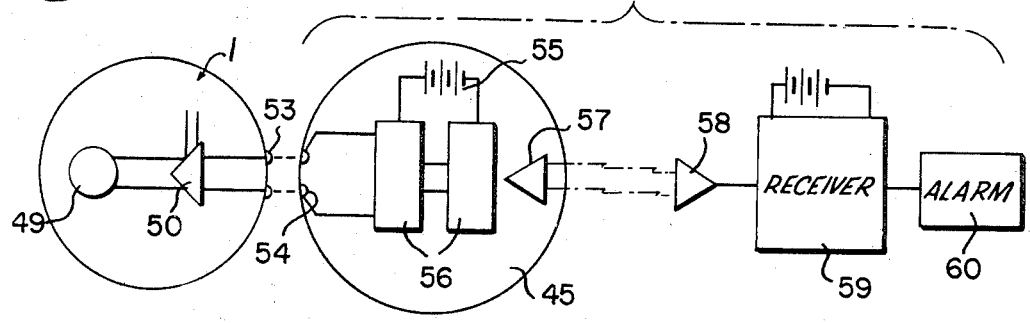
Figure 7:
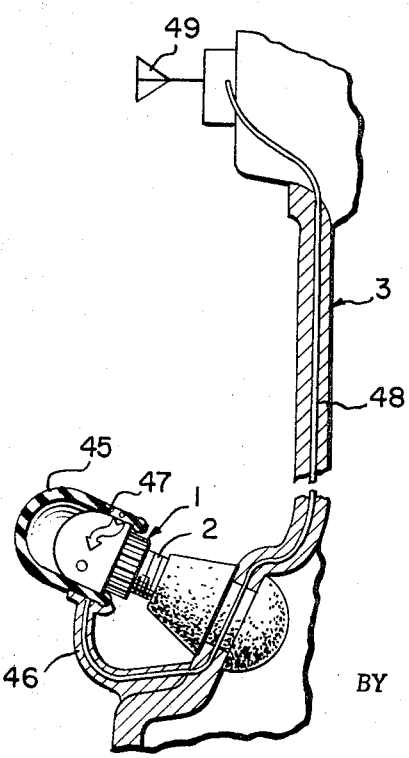
FIG. 7 illustrates an electronic circuit which may be utilized with a gauge.

The present invention is also susceptible to being associated with electronic devcies for transmitting the condition of the tire pressure to a remote distance, such as to a means provided on the dashboard or the interior of the car adjacent the driver, similar to the operation of the apparatus disclosed in a patent to E. A. Sprigg of Dec. 13, 1955, Pat. No. 2,727,221. In this regard, and as seen in FIGS. 7 through 9, several electronic arrangements are shown for accomplishing this end result. With reference to FIG. 7, a removable plastic dust cap 45 is connected by a flexible strap 46 to the wheel assembly 3 for encasing the gauge 1. The cap and strap are provided with a conductor means 47 which in turn is associated with a printed circuit 48, shown schematically, leading to an antenna 49 located centrally of the wheel to minimize any centrifugal or pulsating forces. The antenna transmits the change in pressure to a receiver, not shown, located adjacent the driver within the car. The circuitry includes a transducer for converting the pressure signal to an electrical one, in a manner as explained hereinafter, in conjunction with the remaining figures.

In FIG. 8, the signal transmitting means includes the dust cap 45, shown schematically, in its relationship with the gauge 1 which has been provided with a pressure transducer 49 and amplifier 50. As in FIG. 7, the electronic component of the gauge is associated with a printed circuit 48 via terminal connectors 53, 54 within the wheel assembly 3 but, in this embodiment, cooperates with a slip ring 51 which is mounted for rotation with respect to the wheel 3. The slip ring 51 in turn is electrically connected to a power source, such as the car battery 52, which in turn is connected to a receiver and an alarm provided within the car adjacent the driver. In use, as the slip ring cuts through a field of magnetic flux, it transmits to the receiver a continual indication of the pressure located within the tire; however, when danger conditions arise as an extremely high or low pressure, the receiver will serve to energize an alarm which in turn will alert the driver as to the unsafe condition of the tires.

In FIG. 9, the electronic embodiment includes a pressure gauge equipped with a pressure transducer and amplifier as in FIG. 8 as well as the terminals 53 cooperating with terminals 54 mounted in the flexible cap 45. The terminals 54 in turn are associated with a power source 55 and a miniature circuit arrangement 56 having a sending antenna 57. In this embodiment, the change in pressure is changed to a radio signal via the pressure transducer and such change is picked up on a receiving antenna 58 which in turn is associated with a receiver and an alarm 59 and 60, respectively. Again, any change in pressure will be communicated to the driver in order that he may take required precautions.

While a dust cap 45 is shown in FIGS. 7, 8 and 9 as the preferred means for electronically communicating the pressure change, it is considered to be obvious to eliminate the cap and merely provide the conductor leads 47 for cooperation with the transducer.

It is to be understood that the forms of the invention herewith shown and described are to be taken as preferred examples of the same, and that various changes in the shape, size and arrangement of parts may be resorted to, without departing from the spirit of the invention.

I claim:

1. A gauge comprising a one piece main support member having means thereon adapted to be connected with a valve controlling a source of fluid pressure and including a hollow stem terminating in a domed shaped portion having a wall defining an opening disposed centrally thereof, indicator means including a solid stem and a domed shaped portion nesting about said main support domed portion with the stem thereof positioned in said opening to provide a compact arrangement therebetween, indicia means on said indicator means indicating a pressure reading, actuator means disposed between said main support means and said indicator means including a domed shaped portion and a hollow stem with the stem slidably disposed between said wall defining said opening and said solid stem, a cam track and pin following means disposed on said actuator and said indicator stem for rotatably moving the latter upon vertical movement of the actuator, spring means positioned between said solid stem and said actuator stem urging the same apart, diaphragm means disposed adjacent said actuator means and adapted to move the same upon engagement therewith, valve actuating means adapted to open said valve to permit flow of fluid against said diaphragm means for its engagement with said actuator for controlling the vertical movement of the same whereby the indicator means will designate the amount of pressure being exerted thereagainst, a cover encasing the aforementioned means and being sealed to the main support and providing a bearing means adjacent its top for receiving a portion of the indicator means whereby the latter is additionally supported for rotation, and wherein the diaphragm means and the valve actuating means are of the same general shape whereby the diaphragm will nest within said valve actuating means in a relaxed position.

2. A gauge as defined by claim 1 wherein said indicator means includes a plurality of segmented areas each of which is color coded to designate various degrees of pressure.

3. A gauge as defined by claim 1, wherein said indicator means includes luminous means for facilitating the reading thereof in darkness.

4. A gauge as defined by claim 1, wherein the diaphragm is provided with a thickened peripheral edge for securing the same with respect to the main support member whereby the same prevents the escape of fluid from said source of fluid pressure and from said air chamber.

5. A gauge as defined by claim 1, wherein electronic means are associated with said indicator means for transmitting the pressure reading to a remote position.

6. A gauge as defined by claim 5, wherein the electronic means comprises a pressure transducer means cooperating with conductor means positioned adjacent thereto for communicating said pressure reading.

7. The gauge as defined by claim 6, wherein the conductor means is shaped as a cover for receiving said cap means.

8. A gauge as defined by claim 5, wherein a receiver and an alarm are provided for receiving said pressure communicated by said electronic means whereupon the alarm will be actuated on the occurrence of a pressure above or below predetermined limits.

References Cited

UNITED STATES PATENTS

| | | | |
|---|---|---|---|
| 2,246,741 | 6/1941 | Loen | 116—129 |
| 2,618,290 | 11/1952 | Van Vliet | 73—4 XR |
| 2,727,221 | 12/1955 | Sprigg. | |
| 3,177,724 | 4/1965 | Trinca | 73—146.8 XR |
| 3,208,264 | 9/1965 | Melton | 73—4 |
| 3,224,264 | 12/1965 | Becciani et al. | 73—146.8 |
| 3,230,968 | 1/1966 | Struby | 73—146.8 XR |
| 3,370,336 | 2/1968 | Otto | 73—4 XR |

LOUIS R. PRINCE, Primary Examiner

H. C. POST, III, Assistant Examiner

U.S. Cl. X.R.

73—406, 4; 340—58